United States Patent
Shiao et al.

(10) Patent No.: US 9,159,478 B2
(45) Date of Patent: Oct. 13, 2015

(54) ROTARY RESISTANCE DEVICE

(71) Applicant: NATIONAL TAIPEI UNIVERSITY OF TECHNOLOGY, Taipei (TW)

(72) Inventors: Yaojung Shiao, Taipei (TW); Guan-Da Huang, Taipei (TW)

(73) Assignee: NATIONAL TAIPEI UNIVERSITY OF TECHNOLOGY (TW)

( * ) Notice: Subject to any disclaimer, the term of this patent is extended or adjusted under 35 U.S.C. 154(b) by 0 days.

(21) Appl. No.: 14/474,432

(22) Filed: Sep. 2, 2014

(65) Prior Publication Data
US 2015/0243422 A1      Aug. 27, 2015

(30) Foreign Application Priority Data
Feb. 27, 2014   (TW) .............................. 103106664 A

(51) Int. Cl.
*H02K 7/10*      (2006.01)
*F16D 57/00*    (2006.01)
*H01F 5/00*     (2006.01)

(52) U.S. Cl.
CPC ............... *H01F 5/00* (2013.01); *F16D 57/002* (2013.01); *H02K 7/10* (2013.01)

(58) Field of Classification Search
CPC ............ F16D 57/00–57/06; H02K 7/10–7/125
USPC ........... 188/267, 267.1, 267.2, 322.5, 322.19; 310/77
See application file for complete search history.

(56) References Cited

U.S. PATENT DOCUMENTS 8,193,670 B2 * 6/2012 Liao et al. ....................... 310/77

* cited by examiner

*Primary Examiner* — Ramon Barrera
(74) *Attorney, Agent, or Firm* — Schmeiser, Olsen & Watts, LLP

(57) ABSTRACT

A rotary resistance device providing resistance to rotary object includes a magnetic field generating assembly having a magnetizable main body, an even number of magnetizable extended bodies, magnetizable coils and separators, two first caps, and two shaft sections; a magnetizable outer cylinder enclosing the magnetic field generating assembly therein and rotatably connected to the shaft sections; and a magnetorheological fluid filled in a space formed between the magnetic field generating assembly and the magnetizable outer cylinder. The magnetizable extended bodies have the magnetizable coils wound thereon and are radially equally spaced on the magnetizable main body; the separators are respectively connected to between two adjacent magnetizable extended bodies; the first caps are closed onto two ends of the assembled magnetizable main body, magnetizable extended bodies and separators to seal the magnetizable coils in the magnetic field generating assembly; and the shaft sections are fixedly connected to the first caps.

8 Claims, 4 Drawing Sheets

ROTARY RESISTANCE DEVICE

CROSS-REFERENCE TO RELATED APPLICATION

This non-provisional application claims priority under 35 U.S.C. §119(a) on Patent Application No(s). 103106664 filed in Taiwan, R.O.C. on Feb. 27, 2014, the entire contents of which are hereby incorporated by reference.

FIELD OF TECHNOLOGY

The present invention relates to a resistance device, and more particularly to a rotary resistance device that utilizes magnetorheological fluid to provide a resistance to a rotary object.

BACKGROUND

A magnetorheological fluid (MRF) is a rapidly developing smart material. When the MRF is subjected to a magnetic field, solid magnetic particles within the MRF are caused to align themselves with the direction of the magnetic lines of force between the N pole and the S pole and accordingly form a plurality of particle chains between the two poles. The formation of the particle chains in the magnetorheological fluid produces an effect of anti-shear stress.

Among the conventional resistance devices that employ the MRF, there is a type of internal rotary resistance device, which mainly includes an outer cylinder, an inner magnetizable body, and a magnetorheological fluid. The outer cylinder encloses the inner magnetizable body therein. A plurality of magnetizable bars is circumferentially arranged on the inner magnetizable body, and each of the magnetizable bars has a coil wound thereon to serve as an applied magnetic field. The magnetizable bars with the coils wound thereon respectively have two ends outward extended through the outer cylinder. When the coils are supplied with a voltage or an electric current, a magnetic field is generated. The inner magnetizable body is rotatable relative to the outer cylinder. And, the magnetorheological fluid is filled in a space formed between the outer cylinder and the inner magnetizable body.

The manner in which the conventional internal rotary resistance device provides the resistance is described below. When the inner magnetizable body rotates about and relative to the outer cylinder, a voltage or an electric current can be supplied to the coils to generate a magnetic field. At this point, magnetic particles in the magnetorheological fluid located within the acting area of the magnetic field would align with the direction of the magnetic lines of force extended between the North and the South pole of the magnetic field to form particle chains between the two poles, which in turn produces an effect of anti-shear stress on an outer surface of the inner magnetizable body and an inner surface of the outer cylinder, preventing the inner magnetizable body from rotating relative to the outer cylinder, so as to achieve the purpose of providing a resistance.

With the structural arrangements of the conventional internal rotary resistance device, an increased resistance can be provided only when the space formed between the outer cylinder and the inner magnetizable body is increased to allow for more contact areas with the magnetorheological fluid. In this case, the internal rotary resistance device would have a disadvantageously expanded volume.

SUMMARY

To solve the above disadvantage of the conventional internal rotary resistance device, it is a primary object of the present invention to provide a rotary resistance device that has minimized volume and weight due to a good internal structural arrangement enabling optimal space utilization.

To achieve the above and other objects, the rotary resistance device according to the present invention includes a magnetic field generating assembly, a magnetizable outer cylinder, and a magnetorheological fluid. The magnetic field generating assembly includes a magnetizable main body, an even number of magnetizable extended bodies, an even number of magnetizable coils, an even number of separators, two pieces of first caps, and two shaft sections. The magnetizable extended bodies are radially spaced on an outer surface of the magnetizable main body at equal angular intervals; the magnetizable coils are respectively wound on one of the magnetizable extended bodies; the separators are respectively connected to between two adjacent ones of the magnetizable extended bodies; the first caps are closed onto two opposite ends of the assembled magnetizable main body, magnetizable extended bodies and separators to seal the magnetizable coils in the magnetic field generating assembly; and the shaft sections are fixedly connected to the first caps. The magnetizable outer cylinder encloses the magnetic field generating assembly therein and is rotatably connected to the two shaft sections. The magnetorheological fluid is filled in a space formed between the magnetic field generating assembly and the magnetizable outer cylinder.

In an embodiment of the present invention, the magnetizable extended bodies respectively include a bar-shaped magnetizable neck portion and a curved magnetizable top portion; the magnetizable coils are respectively wound on one of the bar-shaped magnetizable neck portions; and the separators are respectively connected to between two adjacent ones of the curved magnetizable top portions.

In an embodiment of the present invention, any two adjacent ones of the curved magnetizable top portions have magnetic fields of two opposite directions.

In an embodiment of the present invention, the shaft sections are formed of a rotary shaft that axially extends through the first caps and the magnetizable main body.

In an embodiment of the present invention, the magnetic field generating assembly further includes two pieces of first washers, and the first washers are respectively fitted between one first cap and one end of the magnetizable extended bodies and the separators.

In an embodiment of the present invention, the magnetizable outer cylinder includes a magnetizable cylindrical shell and two pieces of second caps. The second caps are separately connected to two opposite ends of the magnetizable cylindrical shell. The magnetizable main body, the magnetizable extended bodies, the magnetizable coils, the separators and the first caps are located in the cylindrical shell, and the shaft sections are rotatably connected to the second caps.

In an embodiment of the present invention, the magnetizable outer cylinder further includes two pieces of second washers; and the second washers are respectively fitted between one second cap and one end of the magnetizable cylindrical shell.

In an embodiment of the present invention, the magnetizable main body is in the form of a round bar, the magnetic field generating assembly has a configuration like a round bar, and the magnetizable outer cylinder is in the form of a hollow cylindrical member.

With the magnetic field generating assembly, the magnetizable outer cylinder and the magnetorheological fluid arranged in the above manner to form the rotary resistance device of the present invention, the magnetizable outer cylinder can rotate about and relative to the magnetic field generating assembly, and the magnetic fields produced by the magnetic field generating assembly can act on the magnetorheological fluid, which causes the solid magnetic particles in the magnetorheological fluid to align themselves with the direction of the magnetic lines of force between the N pole and the S pole and accordingly form a plurality of particle chains between the two poles. The formation of the particle chains in the magnetorheological fluid produces an effect of anti-shear stress and accordingly provides a resistance to the magnetizable outer cylinder

BRIEF DESCRIPTION

The structure and the technical means adopted by the present invention to achieve the above and other objects can be best understood by referring to the following detailed description of the preferred embodiments and the accompanying drawings, wherein FIG. 1 is an exploded perspective view of a rotary resistance device according to a preferred embodiment of the present invention;

DETAILED DESCRIPTION

Figure 1:
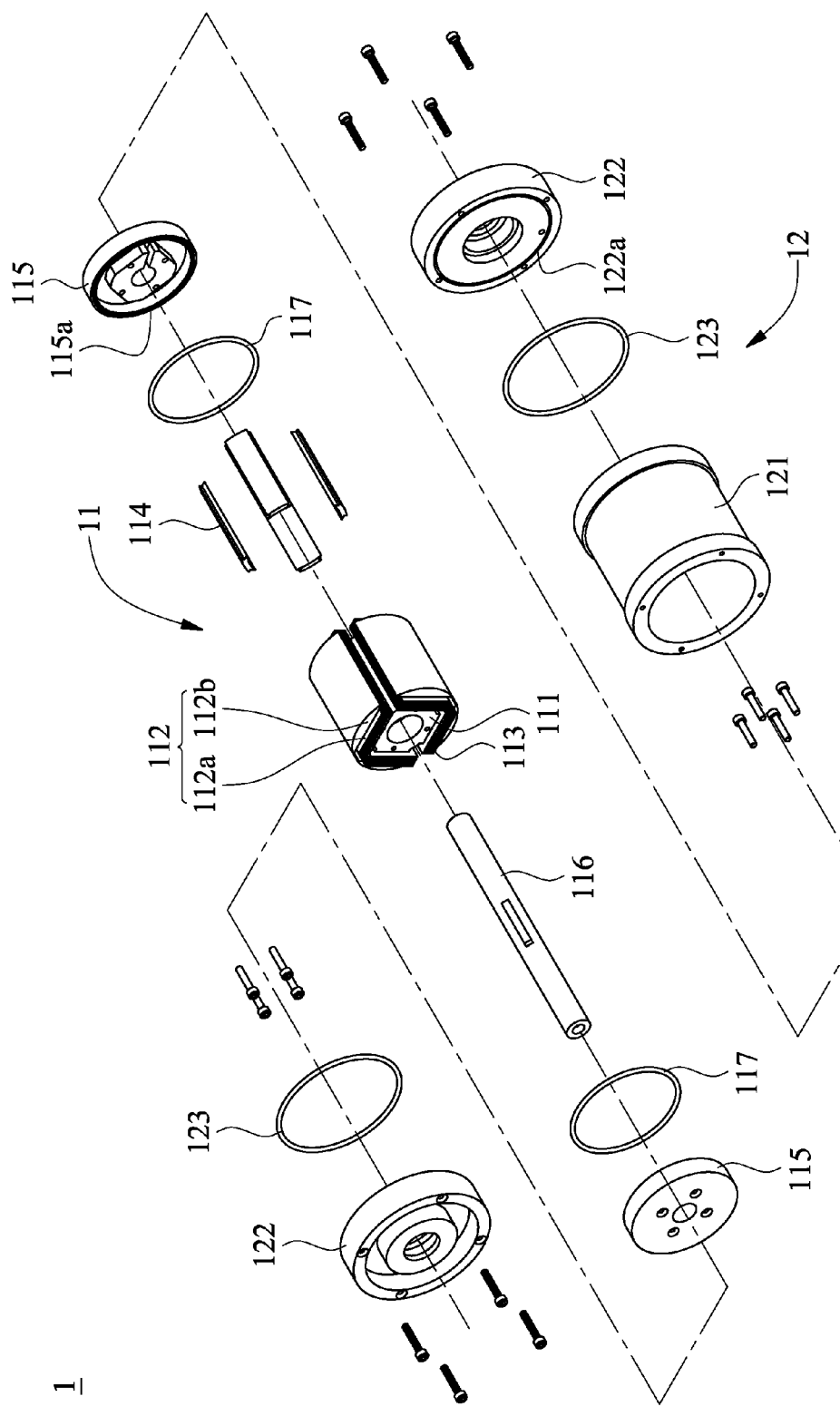

The present invention will now be described with some preferred embodiments thereof and with reference to the accompanying drawings. For the purpose of easy to understand, elements that are the same in the preferred embodiments are denoted by the same reference numerals.

Figure 2:
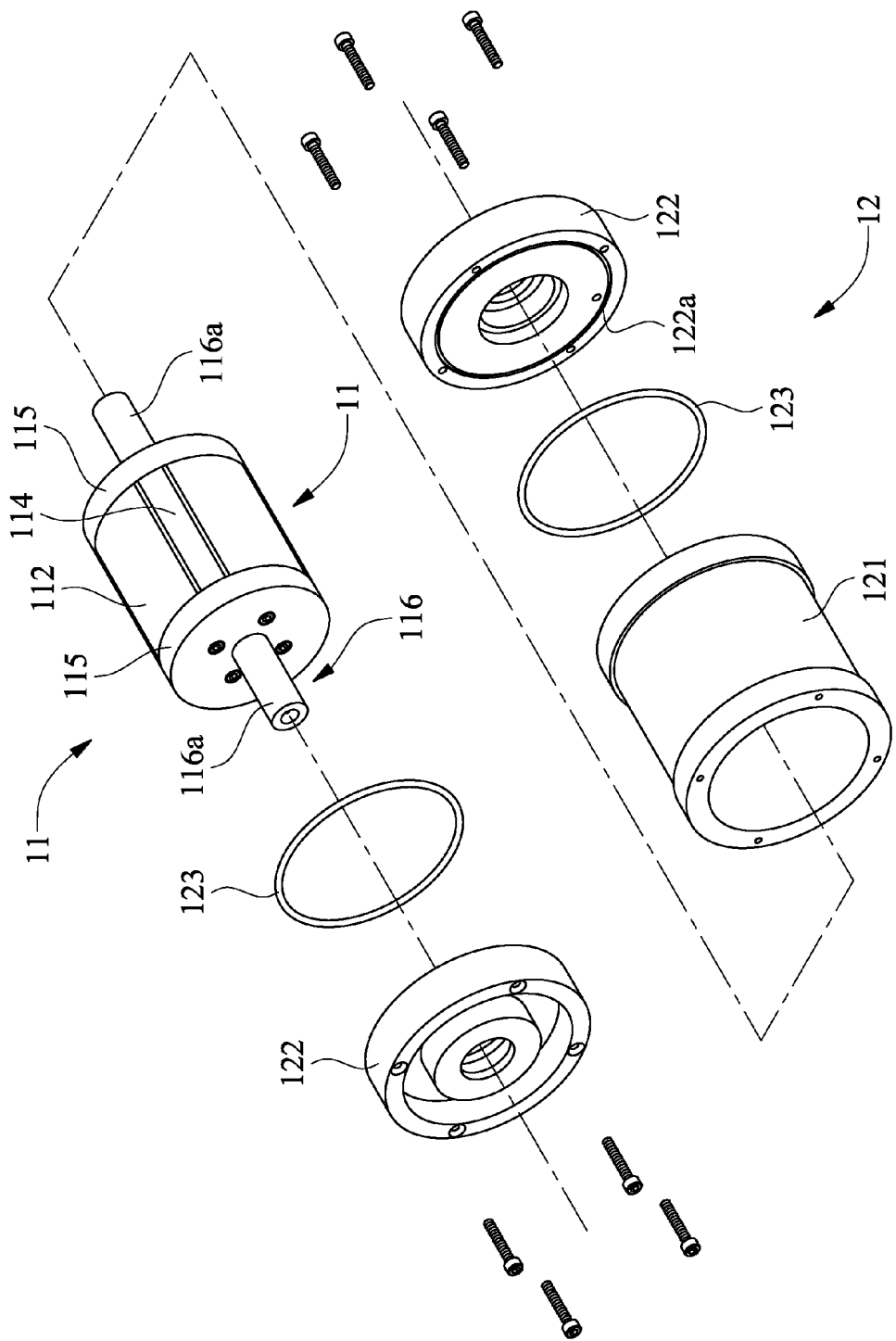
FIG. 2 is a partially assembled view of FIG. 1.
Figure 3:
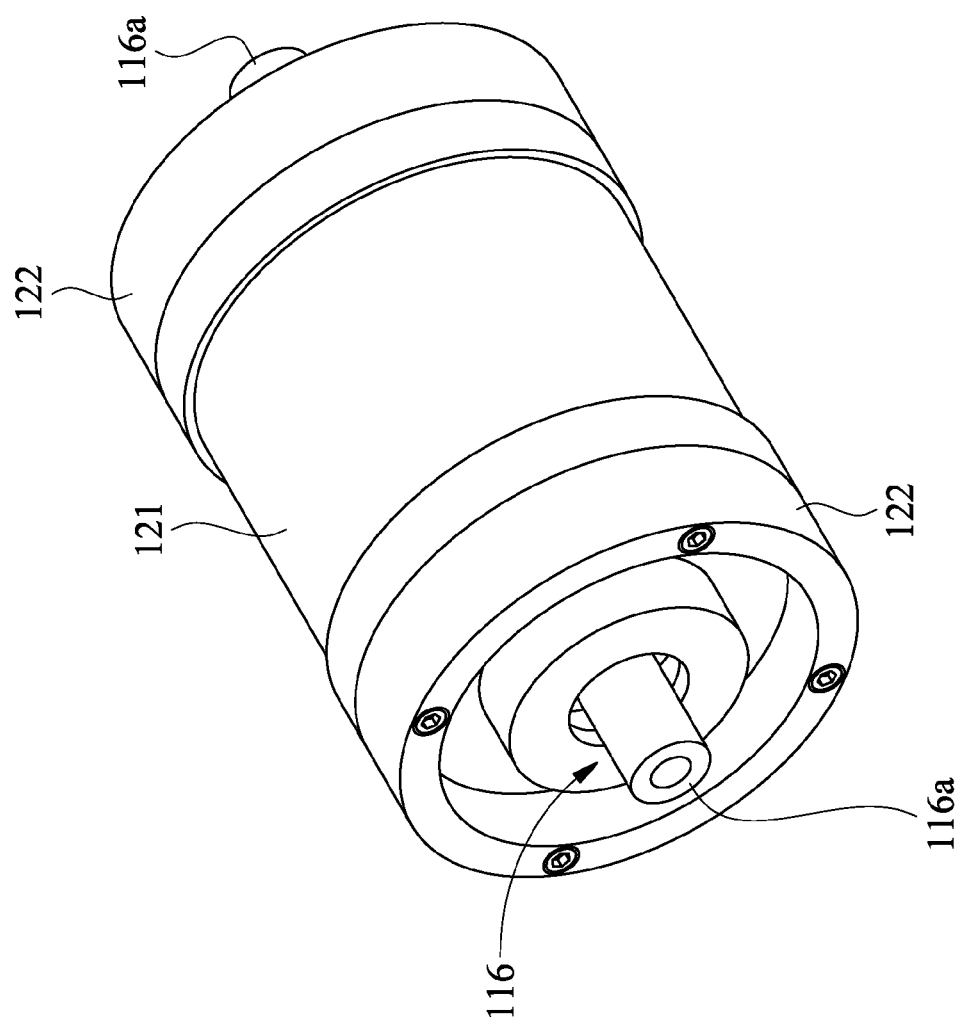
FIG. 3 is a fully assembled view of FIG. 1.
Figure 4:
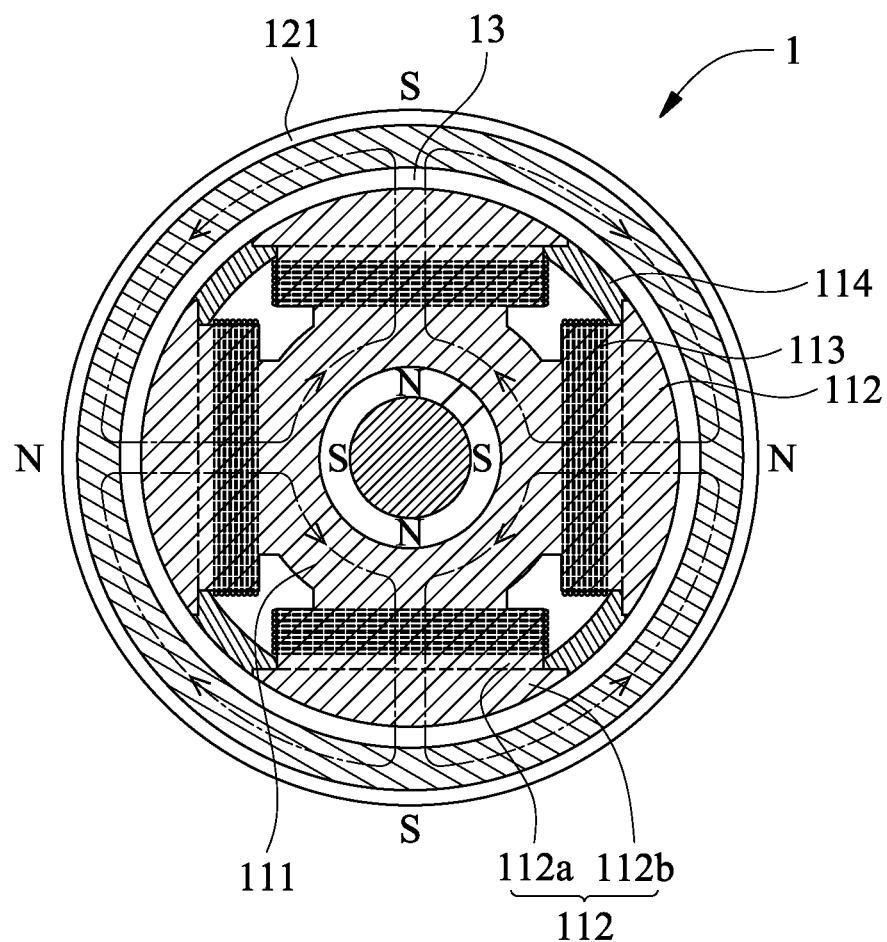
FIG. 4 is an assembled cross-sectional view of the rotary resistance device according to the preferred embodiment of the present invention.

Please refer to FIGS. 1 to 4, in which FIG. 1 is an exploded perspective view of a rotary resistance device 1 according to a preferred embodiment of the present invention, FIGS. 2 and 3 are partially and fully assembled views, respectively, of the rotary resistance device of FIG. 1, and FIG. 4 is an assembled cross-sectional view of the rotary resistance device of FIG. 1.

As shown in FIG. 1, the rotary resistance device 1 includes a magnetic field generating assembly 11, a magnetizable outer cylinder 12, and a magnetorheological fluid 13 (see FIG. 4).

The magnetic field generating assembly 11 includes a magnetizable main body 111, an even number of magnetizable extended bodies 112, an even number of magnetizable coils 113, an even number of separators 114, two pieces of first caps 115, and two shaft sections 116a.

In the illustrated preferred embodiment, the magnetizable main body 111 is a round bar in shape. However, in other operable embodiments, the magnetizable main body 111 can be a rectangular cuboid, a triangular prism or any other suitable polygonal prism in shape.

The magnetizable extended bodies 112 are spaced at equal angular intervals on an outer surface of the magnetizable main body 111. That is, the magnetizable extended bodies 112 are radially evenly spaced on the outer surface of the magnetizable main body 111. More specifically, in the illustrated preferred embodiment, there are four magnetizable extended bodies 112 radially equally spaced on the outer surface of the magnetizable main body 111 at 90-degree angular intervals. In the case of having two magnetizable extended bodies 112, they are radially spaced on the outer surface of the magnetizable main body 111 at 180-degree angular intervals. Or, in the case of having six magnetizable extended bodies 112, they are radially spaced on the outer surface of the magnetizable main body 111 at 60-degree angular intervals. Accordingly, the arrangement of the magnetizable extended bodies 112 on the outer surface of the magnetizable main body 111 depends on the number of the magnetizable extended bodies 112. In principle, the magnetizable extended bodies 112 are radially evenly spaced on the outer surface of the magnetizable main body 111. The purpose of the above-described arrangements of the magnetizable extended bodies 112 is to evenly generate magnetic fields around the magnetizable main body 111 and accordingly have evenly distributed magnetic lines of force. In the present invention, the magnetizable extended bodies 112 can be integrally formed with the magnetizable main body 111, or be assembled to the magnetizable main body 111 by way of snap-fitting, gluing, welding or screwing.

The magnetizable coils 113 are separately wound on the magnetizable extended bodies 112. More specifically, the magnetizable coils 113 are respectively immovably arranged at a position between the outer surface of the magnetizable main body 111 and a top portion of one magnetizable extended body 112, such that a combination of each magnetizable extended body 112 and the magnetizable coil 113 wound thereon forms an electromagnet. In other words, the electromagnets will respectively produce a magnetic field having a north pole (N pole) and a south pole (S pole) when an electric current flows through the magnetizable coils 113. Further, the number of turns of the magnetizable coils 113 can be determined according to actual need.

The separators 114 are respectively connected to between two adjacent magnetizable extended bodies 112. More specifically, the separators 114 can be respectively connected to between two adjacent magnetizable extended bodies 112 by way of gluing or snap-fitting. As can be seen in FIG. 4, by arranging the separators 114 and the magnetizable extended bodies 112 in the above manner, the magnetic fields produced between any two adjacent combinations of the magnetizable extended body 112 and the magnetizable coil 113 can form loops passing through the magnetorheological fluid 13.

The first caps 115 are closed onto two opposite ends of the assembled magnetizable main body 111, magnetizable extended bodies 112 and separators 114, so as to seal the magnetizable coils 113 in the magnetic field generating assembly 11. More specifically, the first caps 115 can be closed onto the two opposite ends of the assembled magnetizable main body 111, magnetizable extended bodies 112 and separators 114 by way of screwing, gluing, welding, snap-fitting, or other functionally equivalent ways, so as to seal the magnetizable coils 113 in the magnetic field generating assembly 11.

As can be seen from FIG. 2, the shaft sections 116a can be connected to the first caps 115 by way of screwing, gluing, welding, snap-fitting and the like.

The magnetizable outer cylinder 12 encloses the magnetic field generating assembly 11 therein, and is rotatably connected to the shaft sections 116a. Further, the magnetizable outer cylinder 12 can be rotatably connected at two opposite ends to the shaft sections 116a via two bearing structures, so as to rotate about and relative to the magnetic field generating assembly 11.

The magnetorheological fluid 13 is filled in a space formed between the magnetic field generating assembly 11 and the magnetizable outer cylinder 12. Being stopped by the separators 114, the top portions of the magnetizable extended bodies 112 and the first caps 115, the magnetorheological fluid 13 is limited to flow only in the space between the magnetic field generating assembly 11 and the magnetizable outer cylinder 12 without flowing into a sealed space in the magnetic field generating assembly 11. In this manner, the magnetorheological fluid 13 would not affect the magnetizable extended bodies 112 and the magnetizable coils 113 from generating magnetic fields.

Please refer to FIGS. 3 and 4. When two inverse voltages are separately applied to any two adjacent magnetizable coils 113, a plurality of magnetic field loops passing through the magnetorheological fluid 13 is formed between the two magnetizable extended bodies 112 on which the two adjacent magnetizable coils 113 are wound. These magnetic field loops can exist at the same time to achieve an increased magnetic field performance. Further, since the resistance provided by the rotary resistance device 1 is applied to the magnetizable outer cylinder 12, it means the rotary resistance device 1 provides an arm of resistance and a moment of resistance larger than those of the conventional internal rotary resistance device, and can therefore provide a larger resistance than a conventional internal rotary resistance device of the same volume.

In the above-described rotary resistance device 1, the magnetizable extended bodies 112 respectively include a bar-shaped magnetizable neck portion 112a and a curved magnetizable top portion 112b extended from a radially outer end of the neck portion 112a, such that each of the magnetizable extended bodies 112 has a substantially T-shaped configuration. The neck portions 112a of the magnetizable extended bodies 112 are radially spaced on the outer surface of the magnetizable main body 111 at equal angular intervals. The magnetizable coils 113 are respectively wound on one of the bar-shaped magnetizable neck portions 112a, and the curved magnetizable top portions 112b respectively provide an increased magnetic field actuation area.

The magnetizable coils 113 are wound on the bar-shaped magnetizable neck portions 112a, so that the combination of each magnetizable extended body 112 and the magnetizable coil 113 wound thereon forms an electromagnet. In other words, the electromagnets will respectively produce a magnetic field having an N pole and an S pole when an electric current flows through the magnetizable coils 113. Further, the number of turns of the magnetizable coils 113 can be determined according to actual need.

The separators 114 can be respectively connected to between the curved magnetizable top portions 112b of two adjacent magnetizable extended bodies 112 by way of gluing or snap-fitting. As can be seen in FIG. 4, by arranging the separators 114 and the curved magnetizable top portions 112b in the above manner, the magnetic fields produced between any two adjacent combinations of the magnetizable extended body 112 and the magnetizable coil 113 can form loops passing through the magnetorheological fluid 13.

In the above-described rotary resistance device 1, any two adjacent electromagnets can be so arranged that their magnetic fields have two opposite directions. In this manner, the magnetic fields can have increased action areas. In FIG. 4, two N poles and two S poles are indicated outside the magnetizable outer cylinder 12. It is noted these N poles and S poles are alternately arranged, so that the magnetic lines of force can extend from one electromagnet to another adjacent electromagnet to thereby increase the distribution area of the magnetic lines of force.

In the rotary resistance device 1 of the present invention, as shown in FIGS. 1 and 2, the shaft sections 116a can be formed of a rotary shaft 116 that axially extends through the first caps 115 and the magnetizable main body 111. More specifically, the rotary shaft 116 can be provided with a raised key (not shown) for engaging with a slot formed in a bore of the magnetizable main body 111, so that the rotary shaft 116 is tightly fitted in the magnetizable main body 111. In other words, the rotary shaft 116 and the magnetizable main body 111 rotate synchronously.

According to the rotary resistance device 1 of the present invention, the magnetic field generating assembly 11 can further include two pieces of first washers 117, each of which is fitted between the first cap 115 and one end of the magnetizable extended bodies 112 and the separators 114. More specifically, each of the first caps 115 is provided on an inner side with a first annular groove 115a. The first washers 117 are respectively partially fitted in one first annular groove 115a and partially protruded from the first annular groove 115a. And, the portions of the first washers 117 that are protruded from the first annular grooves 115a are in tight contact with the magnetizable extended bodies 112 and the separators 114.

According to the rotary resistance device 1 of the present invention, the magnetizable outer cylinder 12 includes a magnetizable cylindrical shell 121 and two pieces of second caps 122. The second caps 122 are separately connected to two opposite open ends of the magnetizable cylindrical shell 121, so that the magnetizable main body 111, the magnetizable extended bodies 112, the magnetizable coils 113, the separators 114 and the first caps 115 all are located in the cylindrical shell 121. The shaft sections 116a are rotatably connected to the second caps 122. The shaft sections 116a can be formed of a rotary shaft 116 that axially extends through the first caps 115 and the magnetizable main body 111. More specifically, the second caps 122 can be connected to the two opposite ends of the magnetizable cylindrical shell 121 by way of screwing, gluing, welding, snap-fitting and so on.

According to the rotary resistance device 1 of the present invention, the magnetizable cylindrical shell 121 can further include two pieces of second washers 123, each of which is fitted between the magnetizable cylindrical shell 121 and one of the second caps 122. More specifically, each of the second caps 122 is provided on an inner side with a second annular groove 122a. The second washers 123 are respectively partially fitted in one second annular groove 122a and partially protruded from the second annular groove 122a. And, the portions of the second washers 123 that are protruded from the second annular grooves 122a are in tight contact with the magnetizable cylindrical shell 121.

According to the rotary resistance device 1 of the present invention, the magnetizable main body 111 can be in the form of a round bar, and the magnetic field generating assembly 11 can have a configuration like a round bar, and the magnetizable outer cylinder 12 can be in the form of a hollow cylindrical member. Therefore, the fully assembled rotary resistance device 1 can work with an external structure having a round configuration.

In conclusion, with the magnetic field generating assembly, the magnetizable outer cylinder and the magnetorheological fluid arranged in the above manner to form the rotary resistance device of the present invention, the magnetizable outer cylinder can rotate about and relative to the magnetic field generating assembly, and the magnetic fields generated by the magnetic field generating assembly can act on the magnetorheological fluid, which causes the solid magnetic particles in the magnetorheological fluid to align themselves with the direction of the magnetic lines of force between the N pole and the S pole and accordingly form a plurality of particle chains between the two poles. The formation of the particle chains in the magnetorheological fluid produces an effect of anti-shear stress and accordingly provides a resistance to the magnetizable outer cylinder. Further, the provision of the first washers and on the magnetic field generating assembly and the second washers on the magnetizable outer cylinder also prevents the magnetorheological fluid from easily leaking out of the rotary resistance device.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A rotary resistance device, comprising:
a magnetic field generating assembly including a magnetizable main body, an even number of magnetizable extended bodies, an even number of magnetizable coils, an even number of separators, two pieces of first caps, and two shaft sections; the magnetizable extended bodies being radially spaced on an outer surface of the magnetizable main body at equal angular intervals; the magnetizable coils being respectively wound on one of the magnetizable extended bodies; the separators being respectively connected to between two adjacent ones of the magnetizable extended bodies; the first caps being closed onto two opposite ends of the magnetizable main body, magnetizable extended bodies and the separators to seal the magnetizable coils in the magnetic field generating assembly; and the shaft sections being separately connected to the first caps;
a magnetizable outer cylinder enclosing the magnetic field generating assembly therein and being rotatably connected to the two shaft sections; and
a magnetorheological fluid being filled in a space formed between the magnetic field generating assembly and the magnetizable outer cylinder.

2. The rotary resistance device as claimed in claim 1, wherein the magnetizable extended bodies respectively include a bar-shaped magnetizable neck portion and a curved magnetizable top portion; the magnetizable coils being respectively wound on one of the bar-shaped magnetizable neck portions; and the separators being respectively connected to between two adjacent ones of the curved magnetizable top portions.

3. The rotary resistance device as claimed in claim 2, wherein any two adjacent ones of the curved magnetizable top portions have magnetic fields of two opposite directions.

4. The rotary resistance device as claimed in claim 1, wherein the shaft sections are formed of a rotary shaft that extends through the first caps and the magnetizable main body.

5. The rotary resistance device as claimed in claim 1, wherein the magnetic field generating assembly further includes two pieces of first washers, and the first washers being respectively fitted between one first cap and one end of the magnetizable extended bodies and the separators.

6. The rotary resistance device as claimed in claim 1, wherein the magnetizable outer cylinder includes a magnetizable cylindrical shell and two pieces of second caps; the second caps being separately connected to two opposite ends of the magnetizable cylindrical shell; the magnetizable main body, the magnetizable extended bodies, the magnetizable coils, the separators and the first caps being located in the cylindrical shell; and the shaft sections being rotatably connected to the second caps.

7. The rotary resistance device as claimed in claim 6, wherein the magnetizable outer cylinder further includes two pieces of second washers; and the second washers being respectively fitted between one second cap and one end of the magnetizable cylindrical shell.

8. The rotary resistance device as claimed in claim 1, wherein the magnetizable main body is in the form of a round bar, the magnetic field generating assembly has a configuration like a round bar, and the magnetizable outer cylinder is in the form of a hollow cylindrical member.

\* \* \* \* \*